(12) United States Patent
Liu et al.

(10) Patent No.: US 10,486,679 B2
(45) Date of Patent: Nov. 26, 2019

(54) MANAGEMENT OF GEAR LASH CLOSURE RATE IN A POWERTRAIN SYSTEM

(71) Applicant: GM Global Technology Operations LLC, Detroit, MI (US)

(72) Inventors: Chia-Shang Liu, Ann Arbor, MI (US); Robert L. Morris, Milford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 70 days.

(21) Appl. No.: 15/926,489

(22) Filed: Mar. 20, 2018

(65) Prior Publication Data

US 2019/0291709 A1    Sep. 26, 2019

(51) Int. Cl.
| | |
|---|---|
| *B60W 30/20* | (2006.01) |
| *F16H 57/00* | (2012.01) |
| *B60W 10/08* | (2006.01) |
| *B60W 10/06* | (2006.01) |
| *F16H 63/50* | (2006.01) |
| *F16H 59/14* | (2006.01) |

(52) U.S. Cl.
CPC ............ *B60W 10/08* (2013.01); *B60W 10/06* (2013.01); *B60W 30/20* (2013.01); *F16H 63/50* (2013.01); *B60W 2710/1094* (2013.01); *B60Y 2200/92* (2013.01); *B60Y 2300/72* (2013.01); *B60Y 2300/77* (2013.01); *F16H 2059/144* (2013.01); *F16H 2063/508* (2013.01)

(58) Field of Classification Search
CPC ........... B60W 30/20; B60W 2050/0012; F16H 2057/0012
See application file for complete search history.

(56) References Cited

U.S. PATENT DOCUMENTS

| | | | |
|---|---|---|---|
| 8,359,144 B2 | 1/2013 | Morris et al. | |
| 10,077,042 B2* | 9/2018 | Reed .................... | B60W 20/15 |
| 10,106,145 B2* | 10/2018 | Reed .................... | B60W 20/15 |
| 10,328,925 B2* | 6/2019 | Mccullough .......... | B60W 20/15 |
| 2016/0102757 A1* | 4/2016 | Ye .......................... | B60K 6/445 |
| | | | 701/51 |

* cited by examiner

*Primary Examiner* — Tisha D Lewis
(74) *Attorney, Agent, or Firm* — Quinn IP Law

(57) ABSTRACT

A powertrain system includes a transmission, torque generating device, load coupled to a drive axle, a final drive unit in meshed gear engagement with the output shaft and the drive axle, and a controller. A requested output torque is processed using an open-loop lash state model populated with a capped output torque request table and a lash closure rate estimate table respectively providing a capped torque value and an estimated lash closure rate. Output speed is determined using a plant model, the capped torque value, and the estimated lash closure rate. The powertrain is controlled during the transition using the output speed. A lash angle may be calculated from the closure rate using an integrator logic block. A calibrated lash offset profile may be determined using the lash angle, and a reference speed may be generated using the lash offset profile.

17 Claims, 3 Drawing Sheets

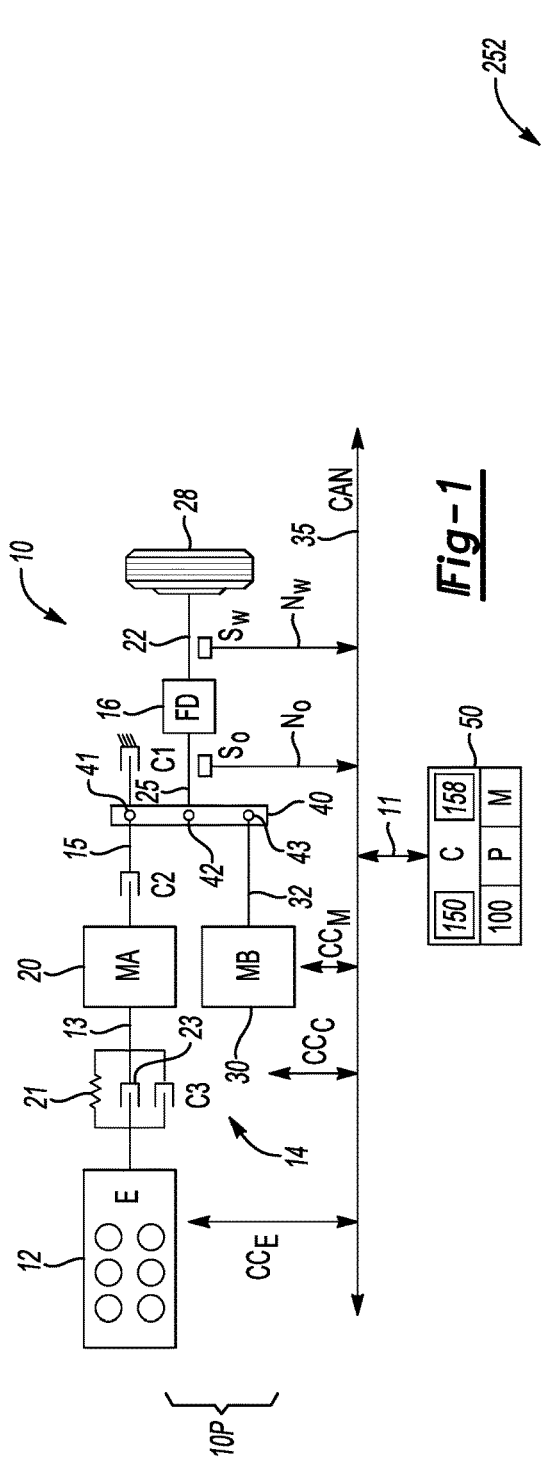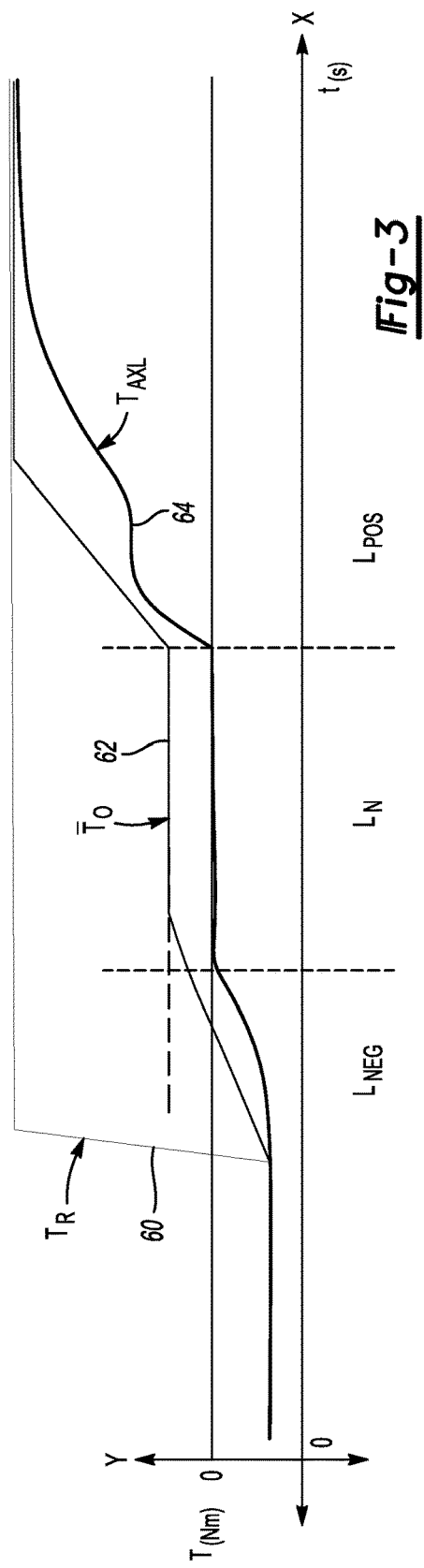

MANAGEMENT OF GEAR LASH CLOSURE RATE IN A POWERTRAIN SYSTEM

INTRODUCTION

Powertrain systems include one or more driveline torque generators, such as an internal combustion engine and/or one or more electric traction motors. Various powertrain components are placed in a meshed gear engagement with one another using splines or gear teeth. Driveline torque is transferred from the torque generator(s), through the meshed driveline components, and ultimately to a driven load. For instance, in a motor vehicle a set of drive wheels is disposed on one or more drive axles in meshed engagement with a differential gear set or final drive unit. An output shaft of a transmission ultimately powers the drive wheels through the intermeshed gears of the final drive unit and drive axle.

The term "driveline lash" describes a condition that results from the play or slack in the above-noted meshed gear components. Slack may be present along the driveline due to manufacturing tolerances, which in turn facilitate component assembly, lubrication, thermal expansion, and load-based component flexing or deflection. A transient gear lash transition state may occur during a torque reversal event, i.e., when a torque direction changes along an axis of the driveline. Undesirable noise, vibration, and harshness may occur, for instance, at the meshed gear interface between the transmission output shaft and final drive unit.

SUMMARY

A lash state transition management methodology and related system are disclosed herein. The present approach may be used with a representative motor vehicle or with other stationary or mobile systems such as power plants, robots, and non-automotive vehicles, e.g., rail vehicles, aircraft, or marine vessels in which driveline torque reversal may result in a transient state of gear lash transition. The control method is executed by a controller in conjunction with a powertrain system having at least one torque generating devices, e.g., an internal combustion engine and/or one or more electric traction motors, a transmission having an output shaft, a final drive unit, a drive axle, and a driven load, e.g., road wheels in an example vehicle embodiment. The torque generating device(s) produce input torque into the transmission, which is then transferred through the transmission at a particular gear ratio to the final drive unit via the transmission output shaft. The final drive unit is mechanically coupled to the drive axle via a meshed gear arrangement, with rotation of the drive axle ultimately rotating the driven load.

In managing a lash state transition during a torque reversal event, the controller employs an open-loop lash state model, which may be performed in conjunction with a calibrated lash offset profile. As part of the lash state model, the controller utilizes two separately-programmed lookup tables: (1) a capped output torque request table, and (2) a lash closure rate estimate table, with the two lookup tables hereinafter referred to as a torque cap table and a rate table, respectively. An output of the lash state model, and the offset profile in certain embodiments, are fed into a driveline proportional-integral (PI) control block or integrator and used by such a control block to derive the actual output speed of the transmission. The derived output speed is thereafter used by the controller to execute control actions, such as by controlling a dynamic operating state of the powertrain system, e.g., by modifying or maintaining a desired level of torque and/or speed of the torque generator(s).

The present method is intended to improve upon existing functionality of state of the art driveline lash control systems. For instance, certain methods rely on the presence of physical speed sensors, e.g., wheel speed resolvers in a motor vehicle application, and the accuracy of such speed data. However, rotary speed sensors tend to exhibit relatively poor low-speed resolution. As a result, it may be difficult for a controller to accurately determine the status of a lash state transition at all speeds when using sensor-based lash management strategies.

Moreover, smaller electric motors are being developed with correspondingly low inertias. Such motors have beneficial uses in certain powertrains, such as performance hybrid electric vehicles. However, the reduced accuracy of speed sensors in closed-loop, sensor-based lash management approaches, when used with such low-inertia motors, may inhibit robust lash transition management. The present approach is therefore intended as an alternative that may be characterized by an absence of wheel speed sensors and feedback measurements from the same, or at least on the reliance of such sensor under low-speed operating conditions.

A particular embodiment of the powertrain system includes a torque generating device, a transmission configured to receive an input torque from the torque generating device and produce an output torque that rotates an output shaft at an output speed, a drive axle, a load coupled to and driven by the drive axle, a final drive unit in meshed gear engagement with the output shaft and the drive axle, and a controller. The controller is configured to manage a lash state transition of the meshed gear engagement via execution of instructions.

Execution of the instructions by a processor of the controller causes the processor to determine a requested output torque, and then process the requested output torque using an open-loop lash state model populated with a capped output torque request table and a lash closure rate estimate table. The tables respectively provide, in response to the requested output torque, a capped torque value and an estimated lash closure rate. The controller is also caused to calculate the output speed using a driveline plant model as a function of the capped torque value and the estimated lash closure rate, and thereafter to control a dynamic operating state of the powertrain during the lash state transition using the output speed to thereby manage the lash state transition.

Execution of the instructions may also cause the controller to calculate a lash angle of the meshed engagement from the estimated lash closure rate using an integrator logic block, determined a calibrated lash offset profile using the lash angle, and then control the dynamic operating state of the powertrain during the lash state transition, including using the calibrated lash offset profile to determine the output speed for use in such operating state control.

The controller may also calculate a reference speed of the torque-generating device using the calibrated offset profile, and then use the driveline plant model to calculate the output speed as a function of the capped torque value and the reference speed.

The torque generating device may include an electric traction motor, in which case the reference speed is a reference speed of the electric traction motor.

The calibrated lash offset profile may have a magnitude that is higher at earlier stages of the lash state transition relative to later stages of the lash state transition.

The powertrain system may form part of a vehicle having a set of drive wheels as the load. In such an embodiment, the torque generating device may include at least one of an electric traction motor and an internal combustion engine coupled to the set of drive wheels. Other embodiments include both the engine and the electric traction motor(s).

A method is also disclosed herein for managing a lash state transition of a meshed gear engagement within the above-noted powertrain system. The method may include determining a requested output torque of the transmission via a controller. Additionally, in response to the requested output torque, the method includes using an open-loop lash state model of the controller to provide a capped torque value and an estimated lash closure rate from respective lookup tables of the open-loop lash state model, and calculating the output speed, using a driveline plant model of the controller, as a function of the capped torque value and the estimated lash closure rate. The method further includes controlling a dynamic operating state of the powertrain during the lash state transition using the output speed.

A motor vehicle is also disclosed. The motor vehicle, in an example embodiment, has at least one electric traction motor, and a transmission coupled to and configured to receive an input torque from the at least one electric traction motor and, in response thereto, to produce an output torque sufficient for rotating the output shaft at an output speed. The motor vehicle also includes a set of drive wheels coupled to and driven by a drive axle, a final drive unit in meshed gear engagement with the output shaft and the drive axle, and a controller configured to manage a lash state transition of the meshed gear engagement via execution of instructions.

Execution of the instructions by a processor of the controller causes the processor to process a requested output torque using an open-loop lash state model populated with a capped output torque request table and a lash closure rate estimate table respectively providing, in response to the requested output torque, a capped torque value and an estimated lash closure rate. The controller also calculates the output speed using a driveline plant model as a function of the capped torque value and the estimated lash closure rate, and calculates a lash angle of the meshed engagement from the estimated lash closure rate using an integrator logic block.

Additionally, the controller is caused to apply a calibrated lash offset profile using the lash angle, with the lash offset profile having a magnitude that is higher at earlier stages of the lash state transition relative to later stages of the lash state transition. Thereafter, the controller calculates a reference speed of the electric traction motor using the lash offset profile, and uses the driveline plant model to calculate the output speed as a function of the capped torque value and the reference speed. A dynamic operating state of the powertrain is then controlled via speed or torque control of the electric traction motor during the lash state transition, using the output speed, to thereby manage the lash state transition.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 1 is a schematic illustration of an example vehicle having a controller programmed to manage a driveline gear lash transition in the manner set forth herein.

FIG. 3 is a time plot describing a capped output torque usable as part of the method disclosed herein, with torque depicted in the vertical (Y) axis and time depicted on the horizontal (X) axis.

Figure 2:
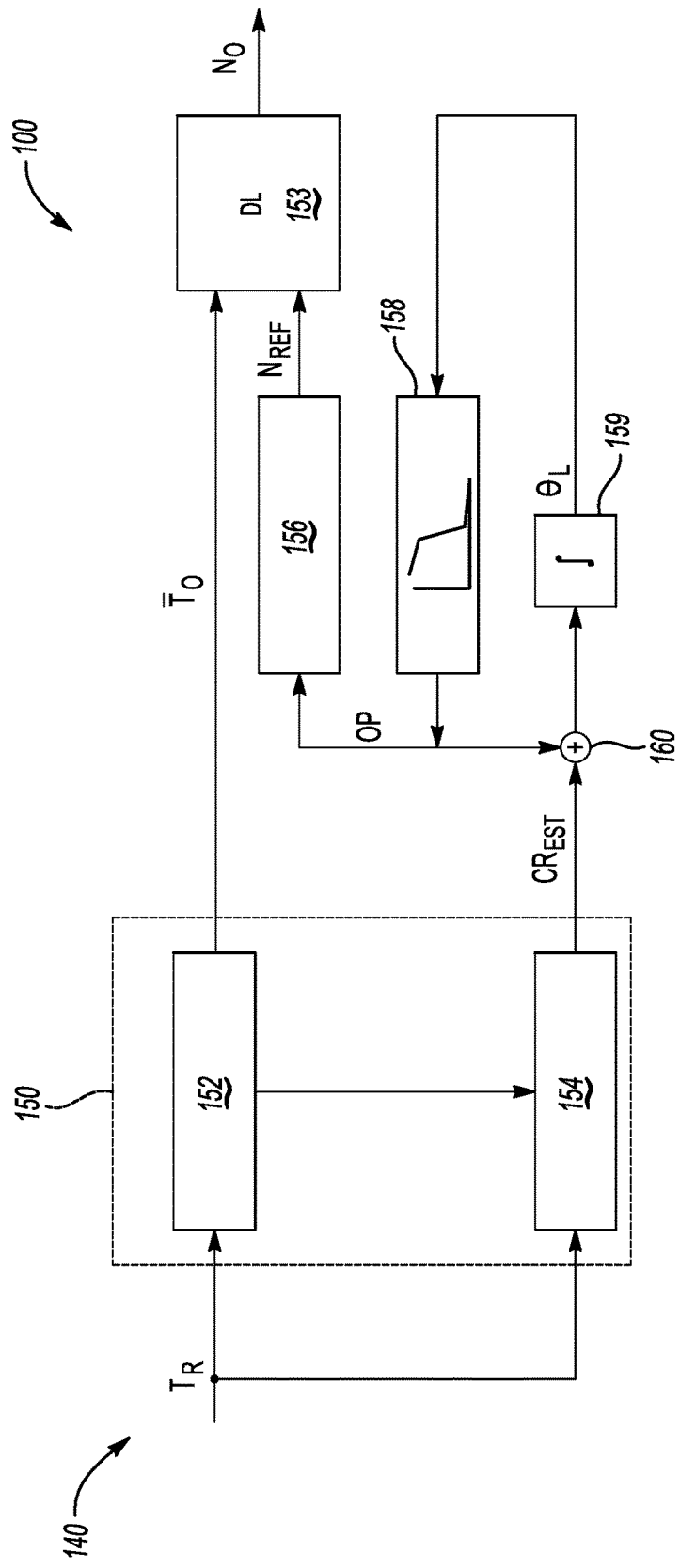
FIG. 2 is a logic flow diagram describing an example controller-based method for managing a lash state transition within the representative vehicle of FIG. 1.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

A vehicle 10 is shown schematically in FIG. 1. The vehicle 10 has a powertrain system 10P. The powertrain system 10P includes a controller (C) 50 and one or more driveline torque generating devices, shown as a representative internal combustion engine (E) 12 and first and second electric traction motors 20 and 30 (MA and MB, respectively). The powertrain system 10P also includes a transmission 14 and a final drive unit (FD) 16. The vehicle 10 of FIG. 1 is shown as an example hybrid electric vehicle which, in a non-limiting illustrative embodiment, uses the engine 12 in combination with the first and second electric traction motors 20 and 30. Fewer or additional electric motors may be used as part of the powertrain system 10P, either alone or in conjunction with the engine 12. Likewise, the engine 12 may be used as the sole source of driveline propulsion torque. For illustrative simplicity, the hybrid configuration of FIG. 1 will be described hereinafter without limiting the disclosure to such a powertrain system 10P.

The controller 50, which includes a processor (P) and memory (M), communicates with the various controllable components within the powertrain system 10P using a set of control signals (arrow 11). Such communication occurs over one or more network connections 35, shown in FIG. 1 as an example controller area network (CAN) bus. The controller 50 may be embodied as one or more digital computers having or sharing a microprocessor or central processing unit as the processor (P), and application-suitable levels of read only memory, random access memory, electrically programmable read only memory, and other memory (M). Additionally, the controller 50 includes an oscillator/high speed clock, requisite analog to digital and digital to analog logic, input/output circuitry and devices, and appropriate signal conditioning and buffer circuitry.

The control signals (arrow 11) enable the controller 50 of FIG. 1 to communicate within the powertrain system 10P. For instance, engine control signals (arrow $CC_E$) may be used to control torque or speed operation of the engine 12, clutch control signals (arrow $CC_C$) may be used to control an on/off apply state of clutches C1, C2, and C3 of the powertrain 10P, and motor control signals (arrow $CC_M$) may be used to control torque or speed of the motors 20 and 30. The controller 50 is shown in FIG. 1 as a unitary control device, but may be embodied in practice as multiple control modules, e.g., an engine control module, transmission control module, motor control module, and the like.

The controller 50 is also programmed with computer-executable instructions embodying a method 100, with the method 100 providing an open-loop strategy for managing a driveline lash state transition. As explained below with particular reference to FIGS. 2-4, the controller 50 uses an open-loop lash state model 150, possibly in conjunction with a calibrated lash offset profile block 158, to ultimately determine an actual rotational output speed of the transmission 14. Thereafter, the controller 50 uses the determined output speed to control operation of the powertrain system 10P, e.g., by controlling a dynamic operating state of the engine 12 and/or the traction motor 20 and/or 30 as needed to meet a requested output torque, e.g., via speed or torque control of the engine 12 and/or one or both electric motors 20, and to smoothly achieve a desired speed of the vehicle 10.

Still referring to FIG. 1, the vehicle 10 may include additional powertrain elements such as an input damper assembly having a spring 21, a friction clutch 23, and a bypass clutch C3. The vehicle 10 in some embodiments may also include at least one planetary gear set 40 having first, second, and third nodes 41, 42, and 43, respectively, e.g., sun gear, ring gear, and carrier member in no particular order. In such an embodiment, a crankshaft 13 of the engine 12 may be connected to the first electric traction motor 20, which in turn may be connected to the first node 41 of planetary gear set 40 via clutch C2 and an interconnecting member 15, e.g., a shaft. The first node 41 may be selectively connected to a stationary member of the transmission 14 via clutch C1, shown in FIG. 1 as a braking clutch. Likewise, the second electric traction motor 30 may be directly connected to the third node 43 via an interconnecting member 32. Other configurations, including those using multiple interconnected gear sets, may be readily envisioned within the scope of the disclosure.

The second node 42 in the illustrative embodiment of FIG. 1 may be connected via a transmission output shaft 25 to the final drive unit 16, with the latter configured as one or more intermeshed differential gear sets. The final drive unit 16 is in meshed engagement with a drive axle 22 and the output shaft 25, with the drive axle 22 coupled to a set of drive wheels 28. In non-vehicular embodiments, the drive wheels 28 may be embodied as another driven load, such as a pulley or rotor of a power generating apparatus. The location of the meshed engagement typically experiences driveline lash during a torque reversal event, and therefore the controller 50 may be configured to manage the transition to or from a lash state at this particular location. Operation of the controller 50 with respect to managing the lash transition will now be explained with reference to FIGS. 2-4.

Referring to FIG. 2, the controller 50 described above with reference to FIG. 1 is programmed in logic to execute instructions embodying the method 100, using the above-noted open-loop lash state model 150. Execution of the instructions thereby causes the controller 50 to perform the various logic steps or control actions detailed below.

In particular, the lash state model 150 includes two separately-programmed lookup tables, i.e., a capped output torque request table 152, which is referred to hereinafter as a "torque cap table" for simplicity, and a lash closure rate estimate table 154 hereinafter referred to as a "rate table". Data from the lash state model 150 and the calibrated offset profile block 158 is ultimately used by the controller 50 to determine the actual output speed of the transmission 14 of FIG. 1 in a manner that smooths the lash state transmission. The present approach is characterized by an absence of reliance on separate wheel speed sensors and data, which as noted above tend to suffer from relatively poor low-speed signal resolution.

The method 100 begins at block 140 with receipt by the controller 50 of a requested output torque (arrow $T_R$). As used herein, the requested output torque (arrow $T_R$) is a desired level of output torque of the transmission 14 shown in FIG. 1, as determined by available input values such as accelerator and/or brake pedal travel, whether such input values are applied by a driver of the vehicle 10 or autonomously by the controller 50 or other autonomous control structure. The requested output torque (arrow $T_R$) is fed into the above-noted torque cap table 152 and rate table 154 of the open-loop lash state model 150.

With respect to the torque cap table 152, this programmed data component may be embodied as a lookup table stored in memory (M) of the controller 50 that is referenced/indexed by a magnitude of the above-noted requested output torque (arrow $T_R$) and a corresponding absolute limit or cap on the actual transmission output torque, with the output of the torque cap table 152 being a limited/capped torque value represented in FIG. 2 as arrow $T_O$. In other words, once the requested output torque (arrow $T_R$) is communicated or otherwise made available to the controller 50, the controller 50 can extract the corresponding capped torque value $T_O$. Similarly, the rate table 154 may be embodied as a lookup table indexed by a magnitude of the requested output torque (arrow $T_R$), this time with a corresponding estimated lash closure rate as represented in FIG. 2 by arrow $CR_{EST}$.

Referring briefly to FIG. 3, the torque cap table 152 may be populated with data that is collected and determined offline, such as by using test data drawn from testing of a fleet of the vehicles 10 of FIG. 1 having similarly configured powertrains 10P. The collected data may be represented via a time plot 252, with time (t) in seconds (s) depicted on the X-axis and torque T in Newton-meters (Nm) depicted on the Y-axis. The time plot 252 is segmented into three stages of a typical torque reversal event, commencing with a period of negative lash ($L_{NEG}$) just prior to entering a lash transition state, progressing through a lash transition period referred to as neutral lash ($L_N$), and ending with exit from the lash transition state with a period of positive lash ($L_{POS}$). Trace 60 of time plot 252 corresponds to the requested output torque ($T_R$), which causes the axle torque ($T_{AXL}$) on the drive axle 22 of FIG. 1 to rise quickly from a negative torque value, through 0 Nm, and to a positive torque value, with such a change in torque direction defining a torque reversal event.

Lagging the rise in the requested output torque (trace 60) is the axle torque ($T_{AXL}$), i.e., trace 64, which plateaus at 0 Nm through the intervening period of neutral lash ($L_N$). Throughout the duration of neutral lash ($L_N$), the controller 50 enforces the capped torque value ($T_O$) as a temporary hard limit or cap on the requested output torque (trace 60), with trace 62 corresponding to the capped torque value ($T_O$). That is, rather than the axle torque (trace 64) following the trajectory of the requested output torque (trace 60) during the lash state transition, the output torque is limited to the capped torque value ($T_O$), i.e., with the controller 50 controlling operation of the torque generating devices to ensure this result. As the vehicle 10 exits the lash transition state, the period of positive lash ($L_{POS}$) is entered in which slack in the meshed components of the driveline of vehicle 10 is taken up. As a result, axle torque (trace 64) rises and eventually reaches a level that is nearly equal to the requested output torque (arrow $T_R$). The capped torque value ($T_O$) is no longer enforced upon entering the positive lash state ($L_{POS}$), with the method 100 of FIG. 2 resuming anew with a subsequent torque reversal event.

Figure 4:
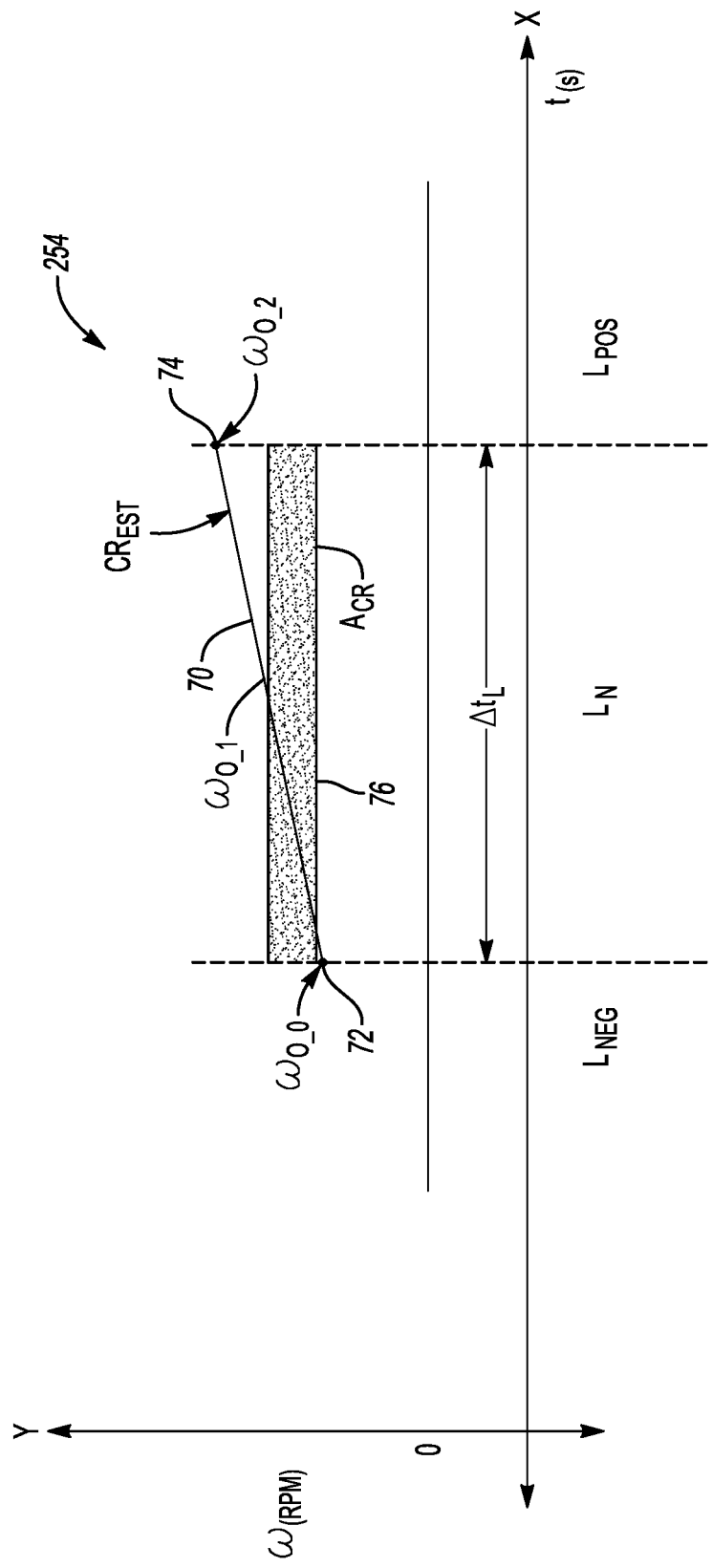
FIG. 4 is a time plot describing lash closure estimate usable as part of the method disclosed herein, with transmission output speed depicted in the vertical (Y) axis and time depicted on the horizontal (X) axis.

FIG. 4 pertains to data population of the rate table 154 used in FIG. 2 for the purpose of generating the estimated lash closure rate ($CR_{EST}$), with the estimated lash closure rate ($CR_{EST}$) represented in FIG. 4 by trace 70 of another time plot 254. As with the torque cap table 152, the rate table 154 may be populated with data determined offline from a fleet of vehicles 10. In time plot 254, time (t) in seconds (s) is depicted on the X-axis and rotational speed (ω) in revolutions per minute (RPM) is depicted on the Y-axis. Points 72 and 74 correspond to the output speed of the transmission 14 of FIG. 1 upon entry into and exit from the lash transition state, respectively. Thus, point 72 is labeled as $\omega_{O\_1}$ to represent output speed at the onset of the lash transition state and point 74 is labeled as $\omega_{O\_2}$ to represent the output speed at exit from the lash transition state. During lash transition, the driveline of the vehicle 10 of FIG. 1 is temporarily disconnected from the drive wheels 28 or other connected load, such that an acceleration speed of the drive axle 22, $\dot{\omega}_{O\_1}$, is equal to $J_{dl} \times \dot{\omega}_O = \overline{T}_O$, where $J_{dl}$ is the predetermined driveline rotational inertia of the powertrain system 10P shown in FIG. 1, $\dot{\omega}_O$ is the acceleration of the output shaft 25 of FIG. 1, and, as noted elsewhere above, $\overline{T}_O$ is the capped torque value.

The estimated mean closure rate, $CR_{EST}$, is defined by the difference in the entry and exit speeds corresponding to points 72 and 74, i.e., $\omega_{O\_0} - \omega_{O\_2}$, which in turn can be approximated as follows:

$$\frac{1}{2} \frac{\overline{T}_O}{J_{dl}} \Delta t_L + \omega_{O\_0}$$

with $\Delta t_L$ representing lash transition time, i.e., the time from entry into to exit from the period of lash state transition. An area 76 ($A_{CR}$) represents the mean closure rate area, with trace 70 adjustable up or down within the area 76 depending on the actual lash entry speed, i.e., $\omega_{O\_0}$.

Referring once again to FIG. 2, the estimated lash closure rate (arrow $CR_{EST}$) represents the average rate at which the output speed of the transmission 14 approaches a lash angle of zero degrees. The estimated lash closure rate (arrow $CR_{EST}$) may be received by an integrator block 159 constructed of a programmed proportional-integral (PI) control logic. The integrator block 159 estimates the present lash angle (arrow $\theta_L$) as the angle between meshed powertrain components experiencing the lash state transition. Integration of the estimated closure rate, $\int CR_{EST} \cdot dt$, as represented by the integral sign in FIG. 2, produces the estimated lash angle (arrow $\theta_L$) as an output of the integrator block 159.

The estimated lash angle (arrow $\theta_L$) is then fed into the calibrated offset profile block 158, with the controller 50 of FIG. 1 thereafter using a value from the calibrated offset profile block 158 to limit the lash angle (arrow $\theta_L$). An offset profile (arrow OP) determined at the calibrated offset profile block 158 using the lash angle (arrow $\theta_L$), e.g., as positive and negative limits applied to the lash angle, is then fed back to a summation node 160 at an input side of the integrator block 159, as well as to a reference speed logic block 156. In general, a slower lash closure rate is desirable at lash exit, as such a rate reduces the severity of lash clunk, i.e., a perceptible bump or gear impact event upon exiting the lash transition state. However, small closure rates have the noted drawback of extending the overall time spent in the lash transition state. To overcome this issue, a lash offset is applied by the controller 50 of FIG. 2 via the calibrated offset profile block 158. The lash offset profile is shaped such that the closure rate is faster when operating nearer to the point of entry into the lash transition period, with the closure rate slowing down nearer the exit from the lash state. Thus, the calibrated lash offset profile may be a gain value with a magnitude that is higher at earlier stages of the lash state transition relative to later stages of the lash state transition. In this manner, the controller 50 uses the calibrated offset profile block 158 to "fine tune" the feel of lash transition at the moment the driveline exits the lash state.

Still referring to FIG. 2, the controller 50 next passes the offset profile (arrow OP) to the reference speed logic block 156. A reference speed (arrow $N_{REF}$) is generated by the reference speed logic block 156, such as by using another lookup table indexed by the offset profile (arrow OP) or as a function thereof, with the speed as used in this portion of the method 100 being the rotational speed of the collective driveline torque devices, e.g., the traction motors 20 and/or 30 and/or the engine 12 of FIG. 1.

The reference speed (arrow $N_{REF}$) may be fed into a driveline (DL) plant model 153, which may be embodied as another PI logic block, along with the capped torque value (arrow $\overline{T}_O$). Plant models such as the driveline plant model 153 represent the predetermined kinematics of a particular powertrain configuration, as well as the predetermined inertia and power flow characteristics. Given a defined input speed, i.e., the reference speed (arrow $N_{REF}$), and given a required torque, in this instance the capped torque value (arrow $\overline{T}_O$), the example driveline model 153 is able to derive and output the actual output speed (arrow $N_O$) of the transmission 14 shown in FIG. 1.

Ongoing awareness of the actual output speed (arrow $N_O$) by the controller 50 is itself critical to optimal control of the powertrain system 10P. Even when wheel speed sensors are not used, the controller 50 can derive and use the actual output speed (arrow $N_O$) in real-time lash management, including possibly executing powertrain control actions upstream of the drive axle 22 to provide real-time control of the dynamic operating state of the vehicle 10, including the engine 12 and electric motors 20 and/or 30, so as to smoothly manage lash transition and limit noise, vibration, and harshness effects during the transition.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed:
1. A powertrain system comprising:
   a torque generating device;
   a transmission having an output shaft, wherein the transmission is configured to receive an input torque from the torque generating device and produce an output torque that rotates the output shaft at an output speed;
   a drive axle;
   a load coupled to and driven by the drive axle;
   a final drive unit in meshed gear engagement with the output shaft and the drive axle; and a controller configured to manage a lash state transition of the meshed gear engagement via execution of instructions, wherein execution of the instructions by a processor of the controller causes the processor to:
  determine a requested output torque;
  process the requested output torque using an open-loop lash state model populated with a capped output torque request table and a lash closure rate estimate table respectively providing, in response to the requested output torque, a capped torque value and an estimated lash closure rate;
  calculate the output speed using a driveline plant model as a function of the capped torque value and the estimated lash closure rate; and
  control a dynamic operating state of the powertrain during the lash state transition using the output speed to thereby manage the lash state transition.

2. The powertrain system of claim 1, wherein execution of the instructions causes the controller to calculate a lash angle of the meshed engagement from the estimated lash closure rate using an integrator logic block, apply a calibrated lash offset profile that is determined using the lash angle, and control the dynamic operating state of the powertrain during the lash state transition by using the calibrated lash offset profile to determine the output speed.

3. The powertrain system of claim 2, wherein execution of the instructions causes the controller to calculate a reference speed of the torque-generating device using the calibrated lash offset profile, and use the driveline plant model to calculate the output speed as a function of the capped torque value and the reference speed.

4. The powertrain system of claim 3, wherein the torque generating device includes an electric traction motor, and wherein the reference speed is a reference speed of the electric traction motor.

5. The powertrain system of claim 2, wherein the calibrated lash offset profile has a magnitude that is higher at earlier stages of the lash state transition relative to later stages of the lash state transition.

6. The powertrain system of claim 1, wherein the powertrain system is part of a vehicle having a set of drive wheels as the load.

7. The powertrain system of claim 6, wherein the torque generating device includes an electric traction motor or an internal combustion engine, and wherein the electric traction motor or the internal combustion engine is coupled to the set of drive wheels.

8. The powertrain system of claim 7, wherein the torque generating device includes the electric traction motor and the internal combustion engine, and wherein the electric traction motor and the internal combustion engine are coupled to the set of drive wheels.

9. A method for managing a lash state transition of a meshed gear engagement within a powertrain system having a torque generating device, a transmission coupled to the torque generating device and having an output shaft, a drive axle connected to a load, and a final drive unit in the meshed gear engagement with the output shaft and the drive axle, the method comprising:
  determining a requested output torque of the transmission via a controller;
  in response to the requested output torque, using an open-loop lash state model of the controller to provide a capped torque value and an estimated lash closure rate from respective lookup tables of the open-loop lash state model;
  calculating the output speed, using a driveline plant model of the controller, as a function of the capped torque value and the estimated lash closure rate; and
  controlling a dynamic operating state of the powertrain during the lash state transition using the output speed.

10. The method of claim 9, further comprising:
  calculating a lash angle of the meshed engagement by processing the estimated lash closure rate through an integrator logic block of the controller;
  applying a calibrated lash offset profile determined using the lash angle; and
  controlling the dynamic operating state of the powertrain during the lash state transition using the calibrated lash offset profile.

11. The method of claim 10, further comprising:
  calculating a reference speed of the torque-generating device using the calibrated lash offset profile;
  calculating the output speed as a function of the capped torque value and the reference speed, using the driveline model; and
  controlling the state of the powertrain using the output speed.

12. The method of claim 11, wherein the torque generating device includes an electric traction motor, and wherein the reference speed is a reference speed of the electric traction motor.

13. The method of claim 11, wherein the calibrated lash offset profile has a magnitude that is higher at earlier stages of the lash state transition relative to later stages of the lash state transition.

14. The method of claim 11, wherein the powertrain system is part of a vehicle having a set of drive wheels as the load, and wherein controlling the state of the powertrain includes rotating the set of drive wheels at a desired speed or with a desired level of torque.

15. The method of claim 14, wherein the torque generating device includes an electric traction motor or an internal combustion engine, and wherein the electric traction motor or the internal combustion engine is coupled to the set of drive wheels.

16. The method of claim 15, wherein the torque generating device includes the electric traction motor and the internal combustion engine, and wherein the electric traction motor and the internal combustion engine are coupled to the set of drive wheels.

17. A motor vehicle comprising:
  at least one electric traction motor;
  a transmission having an output shaft, wherein the transmission is coupled to and configured to receive an input torque from the at least one electric traction motor and, in response thereto, to produce an output torque sufficient for rotating the output shaft at an output speed;
  a set of drive wheels coupled to and driven by a drive axle;
  a final drive unit in meshed gear engagement with the output shaft and the drive axle; and
  a controller configured to manage a lash state transition of the meshed gear engagement via execution of instructions, wherein execution of the instructions by a processor of the controller causes the processor to:
    process a requested output torque using an open-loop lash state model populated with a capped output torque request table and a lash closure rate estimate table respectively providing, in response to the requested output torque, a capped torque value and an estimated lash closure rate;

calculate the output speed using a driveline plant model as a function of the capped torque value and the estimated lash closure rate;
calculate a lash angle of the meshed engagement from the estimated lash closure rate using an integrator logic block;
apply a calibrated lash offset profile using the lash angle, the calibrated lash offset profile having a magnitude that is higher at earlier stages of the lash state transition relative to later stages of the lash state transition;
calculate a reference speed of the electric traction motor using the calibrated lash offset profile;
use the driveline plant model to calculate the output speed as a function of the capped torque value and the reference speed; and
control a dynamic operating state of the powertrain via speed or torque control of the electric traction motor during the lash state transition, using the output speed, to thereby manage the lash state transition.

* * * * *